United States Patent [19]
Suthersan

[11] Patent Number: 5,575,589
[45] Date of Patent: Nov. 19, 1996

[54] APPARATUS AND METHOD FOR REMOVING VOLATILE CONTAMINANTS FROM PHREATIC WATER

[75] Inventor: Suthan S. Suthersan, Yardley, Pa.

[73] Assignee: Geraghty & Miller, Inc., Denver, Colo.

[21] Appl. No.: 420,224

[22] Filed: Apr. 11, 1995

[51] Int. Cl.$^6$ ..................................................... B09B 3/00
[52] U.S. Cl. ................................................................ 405/128
[58] Field of Search ............................ 405/128; 166/266, 166/267

[56] References Cited

U.S. PATENT DOCUMENTS

| | | | |
|---|---|---|---|
| Re. 33,102 | 10/1889 | Visser et al. | 166/267 |
| 825,745 | 7/1906 | Mitchell. | |
| 1,286,666 | 12/1918 | Layne. | |
| 1,877,915 | 9/1932 | Lewis. | |
| 2,104,327 | 1/1938 | Kotzebue | 166/21 |
| 2,180,400 | 11/1949 | Coberly | 103/46 |
| 2,523,091 | 9/1950 | Bruce | 166/2 |
| 2,635,696 | 4/1953 | Asketh | 166/1 |
| 2,765,850 | 10/1956 | Allen | 166/39 |

(List continued on next page.)

FOREIGN PATENT DOCUMENTS

3427532C1  8/1985  Germany.

OTHER PUBLICATIONS

In Situ Aeration of Groundwater: A Technology Overview–Oct. 16, & 17, 1990.
Proceedings of the NWWA/API Conference on Petroleum Hydrocarbons and Organic Chemicals in Ground Water–Prevention, Detection and Restoration–Nov. 13–15, 1985.
Fifth National Outdoor Action Conference on Aquifer Restoration, Ground Water Monitoring, and Geophysical Methods–May 13–16, 1991 (Ground Water Mgmt., Book 5 of the Series).
The Fifth National Symposium and Exposition on Aquifer Restoration and Ground Water Monitoring–May 21–24, 1985.
HAZTECH International '88–Hazardous Waste & Hazardous Materials Management–Sep. 20–22, 1988.
Volume II, Proceedings of Petroleum Hydrocarbons and Organic Chemicals in Ground Water: Prevention, Detection and Restoration–Nov. 9–11, 1988.
Declaration Statement—Record of Decision; Rod Decision Summary (with attachments); and Responsive Summary, Upjohn Manufacturing Company, Superfund Site, Barceloneta, Puerto Rico.
LEXIS NEXIS–Environmental Protection Agency, Upjohn Manufacturing Company–Sep. 30, 1988.
Near Surface Geochemical Monitoring of Underground Gas Storage Facilites–Apr., 1986.
SPL External Vapor Vending (Elimination) Program–Nov. 2, 1983.
Water Well Technology–Field Principals of Exploration Drilling and Development of Ground Water and Other Selected Minerals (4 page cover and pp. 240–308)(Michael D. Campbell and Jay H. Lehr).
Ground Water and Wells–A Reference Book for the Water-Well Industry–4th Printing 1975, Chapter 10, pp. 185–208 and Chapter 20, pp. 375–394.
Hydrogeologic and Geochemical Investigation, Mt. Olive Greens, Mt. Olive Township, N.J.–Nov., 1982.
A Monitoring and Removal Program for Leaked Propane Gas in the Vadose (Unsaturated)Zone: A Case Study (Thomas Lobasso, Jr. and Andrew J. Barber).

*Primary Examiner*—William P. Neuder
*Attorney, Agent, or Firm*—Standley & Gilcrest

[57] ABSTRACT

A method and apparatus for removing volatile contaminants from the phreatic zone of a contaminated region in the ground. The apparatus is a system comprised of a trench cut into the phreatic zone of contaminated ground containing fluid-permeable fill material, an air injection line submerged in the lower portion of the trench and an air/contaminant gas extraction line in the trench above the water table. Air is injected into the contaminated ground water to allow sparging of the volatile contaminants. The volatile contaminants are captured by the injected air and carded to the extraction line for removal and/or treatment.

12 Claims, 2 Drawing Sheets

U.S. PATENT DOCUMENTS

| | | | |
|---|---|---|---|
| 2,875,831 | 3/1959 | Martin et al. | 166/9 |
| 2,969,226 | 1/1961 | Huntington | 262/3 |
| 3,216,905 | 11/1965 | Baptist | 195/2 |
| 3,277,962 | 10/1966 | Flickinger et al. | 166/15 |
| 3,351,132 | 11/1967 | Dougan et al. | 166/11 |
| 3,547,190 | 12/1970 | Wilkerson | 166/75 |
| 3,649,533 | 3/1972 | Reijonen et al. | 210/50 |
| 3,653,438 | 4/1972 | Wagner | 166/266 |
| 3,665,716 | 5/1972 | Rogers et al. | 61/35 |
| 3,705,851 | 12/1972 | Brauer | 210/1 |
| 3,727,686 | 4/1973 | Prates et al. | 166/261 |
| 3,735,815 | 5/1973 | Myers | 166/313 |
| 3,765,483 | 10/1973 | Vencil | 166/265 |
| 3,796,883 | 3/1974 | Smith et al. | 250/260 |
| 3,823,777 | 7/1974 | Allen et al. | 166/266 |
| 3,828,525 | 8/1974 | Copa et al. | 55/68 |
| 3,846,290 | 11/1974 | Raymond | 210/11 |
| 3,980,138 | 9/1976 | Knopik | 166/314 |
| 3,990,513 | 11/1976 | Perch | 166/267 |
| 4,016,930 | 4/1977 | Arnold | 166/266 |
| 4,026,355 | 5/1977 | Johnson et al. | 166/246 |
| 4,126,556 | 11/1978 | Swanson et al. | 210/242 |
| 4,167,973 | 9/1979 | Forte et al. | 166/267 |
| 4,183,407 | 1/1980 | Knopik | 166/314 |
| 4,241,787 | 12/1980 | Price | 166/105 |
| 4,283,212 | 8/1981 | Graham et al. | 62/18 |
| 4,296,810 | 10/1981 | Price | 166/265 |
| 4,303,127 | 12/1981 | Freel et al. | 166/266 |
| 4,306,961 | 12/1981 | Taciuk | 208/11 R |
| 4,323,122 | 4/1982 | Knopik | 166/267 |
| 4,366,846 | 1/1983 | Curati, Jr. | 141/1 |
| 4,369,839 | 1/1983 | Freeman et al. | 166/53 |
| 4,401,569 | 8/1983 | Jhaveri et al. | 210/610 |
| 4,435,292 | 3/1984 | Kirk et al. | 210/747 |
| 4,442,901 | 4/1984 | Zison | 166/369 |
| 4,469,176 | 9/1984 | Zison et al. | 166/250 |
| 4,518,399 | 5/1985 | Croskell et al. | 55/16 |
| 4,544,381 | 10/1985 | Schmidt | 55/89 |
| 4,588,506 | 5/1986 | Raymond et al. | 210/606 |
| 4,593,760 | 6/1986 | Visser et al. | 166/267 |
| 4,660,639 | 4/1987 | Visser et al. | 166/267 |
| 4,662,900 | 5/1987 | Ottengraf | 55/90 |
| 4,723,968 | 2/1988 | Schippert et al. | 55/80 |
| 4,730,672 | 3/1988 | Payne | 166/266 |
| 4,738,206 | 4/1988 | Noland | 110/346 |
| 4,745,850 | 5/1988 | Bastian et al. | 98/56 |
| 4,765,902 | 8/1988 | Ely et al. | 210/610 |
| 4,782,625 | 11/1988 | Gerken et al. | 47/1.42 |
| 4,799,878 | 1/1989 | Schaeffer | 431/202 |
| 4,806,148 | 2/1989 | Ottengraf | 55/223 |
| 4,832,122 | 5/1989 | Corey et al. | 166/266 |
| 4,842,448 | 6/1989 | Koerner et al. | 405/258 |
| 4,846,134 | 7/1989 | Perry et al. | 123/520 |
| 4,848,460 | 7/1989 | Johnson, Jr. et al. | 166/245 |
| 4,850,745 | 7/1989 | Hater et al. | 405/258 |
| 4,864,942 | 9/1989 | Fochtman et al. | 110/226 |
| 4,872,994 | 10/1989 | Jakob | 210/691 |
| 4,886,119 | 12/1989 | Bernhardt et al. | 166/267 |
| 4,890,673 | 1/1990 | Payne | 166/266 |
| 4,895,085 | 1/1990 | Chips | 110/346 |
| 4,919,570 | 4/1990 | Payne | 405/128 |
| 4,945,988 | 8/1990 | Payne et al. | 166/266 |
| 4,951,417 | 8/1990 | Gerken et al. | 47/1.42 |
| 4,982,788 | 1/1991 | Donnelly | 166/266 |
| 5,076,727 | 12/1991 | Johnson et al. | 405/128 |
| 5,080,793 | 1/1992 | Urlings | 210/603 |
| 5,161,914 | 11/1992 | Rahn et al. | 405/128 |
| 5,180,503 | 1/1993 | Gorelick et al. | 210/758 |
| 5,263,795 | 11/1993 | Corey et al. | 405/128 |
| 5,277,815 | 1/1994 | Beeman | 210/605 |
| 5,384,048 | 1/1995 | Hazen et al. | 405/128 X |

APPARATUS AND METHOD FOR REMOVING VOLATILE CONTAMINANTS FROM PHREATIC WATER

BACKGROUND AND SUMMARY OF THE INVENTION

This invention relates to a method and apparatus for removing volatile contaminants from the phreatic zone, also known as the zone of saturation, or, ground water.

Contamination of the phreatic zone with potentially hazardous materials is a common problem facing industry, the government and the general public. Frequently, as a result of spills, leakage from storage facilities or surface discharges, contaminants percolate into ground water, thereby posing a health threat to drinking water supplies. While groundwater is not as susceptible to pollution as surface water, once polluted, its restoration is difficult and long term. Various methods for withdrawing and treating contaminated groundwater have met with limited success. Typically, groundwater is removed from the phreatic zone, treated and then returned to the phreatic zone. This method involves great expense. A need exists for a method and apparatus for removing volatile contaminants from the phreatic zone without the expense of removing and returning the groundwater to the phreatic zone.

One previous attempt at solving these problems involved a closed-loop device which included one or more contaminant withdrawal wells surrounded by multiple air reinjection wells connected by a conduit. This device utilized the principle of sparging. Sparging is the process of forcing air through water to remove undesirable volatile organic contaminants (VOC's). The above described device formed air channels within the phreatic zone that were distributed in three-dimensions. This approach may lead to uncontrolled distribution of contaminants.

The method and apparatus of the present invention also utilizes the principle of sparging. The present invention is advantageous in that it provides an artificially permeable environment that permits sparging to occur. The method involves digging a trench into the phreatic zone downstream of the contaminated water flow. A horizontal injection pipe is preferably laid at the bottom of the trench and the trench is then filled with gravel just above the level of the water table. The injection pipe may be oriented either horizontally or vertically within the trench. An extraction pipe is then laid on the gravel and the trench is filled up to the ground surface preferably with more gravel. The extraction pipe is preferably oriented horizontally. Lastly, a seal may be formed over the trench, preferably at the ground surface to prevent contaminants from escaping to the atmosphere.

When the present invention is operating, air is forced into the injection pipe and out into the groundwater. Volatile contaminants dissolved in the groundwater then evaporate into the injected air. The air/contaminant gas mixture bubbles up through the trench and above the water table where the extraction pipe removes it for treatment. The perpendicular flow of the groundwater allows the trench to remove the volatile contaminants from the groundwater as it moves through the trench. Practically, there is no removal of the groundwater from the phreatic zone.

It may be appreciated that the method and apparatus may be used as a closed loop. The air withdrawn from the extraction pipe may be treated on the surface and recycled back into the injection pipe where the air may once again carry contaminants.

In addition, ammonium ortho phosphate may be trickled into the trench to biodegrade the biodegradeable contaminants.

Objects and advantages of the present invention will be readily apparent upon a reading of the following description.

DETAILED DESCRIPTION OF PREFERRED EMBODIMENT(S)

The preferred method and apparatus herein described are not intended to be exhaustive or to limit the invention to the precise forms disclosed. They are chosen and described to explain the principles of the invention, and the application of the method to practical uses, so that others skilled in the art may practice the invention.

Figure 1:
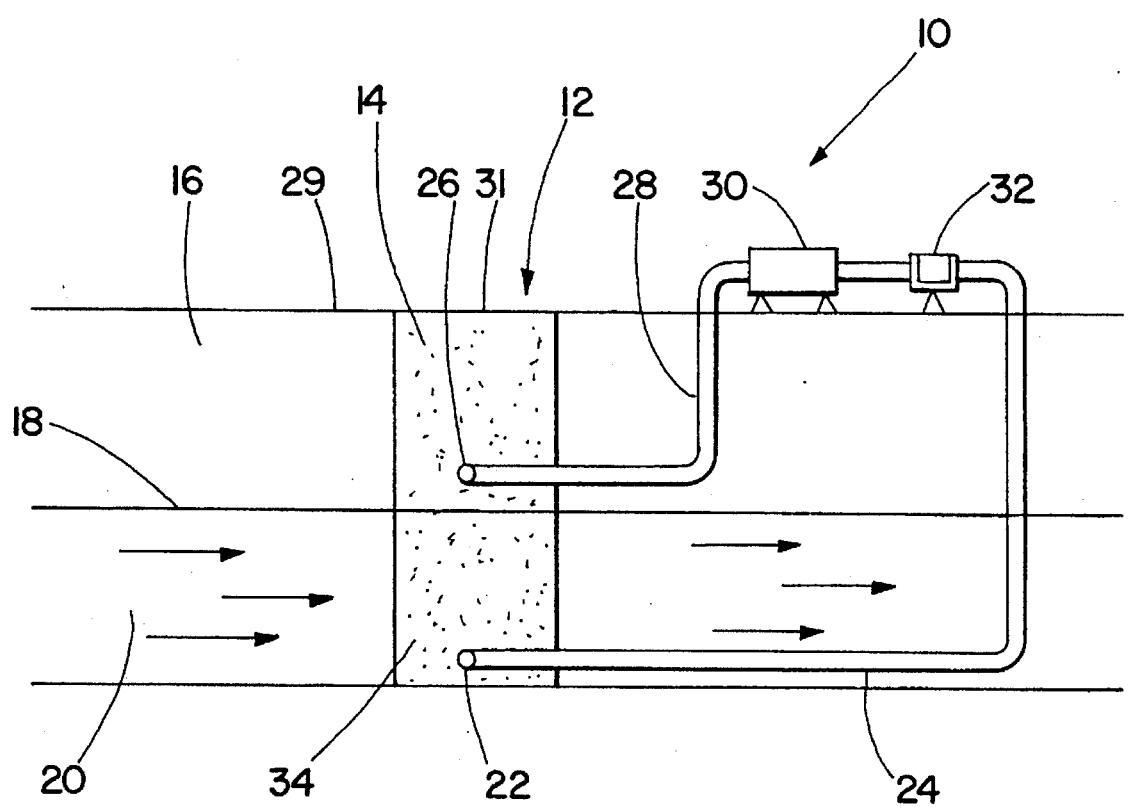
FIG. 1 is a schematic cross-sectional view of a preferred embodiment of the contaminant recovery apparatus according to the principles of the present invention.
Figure 3:
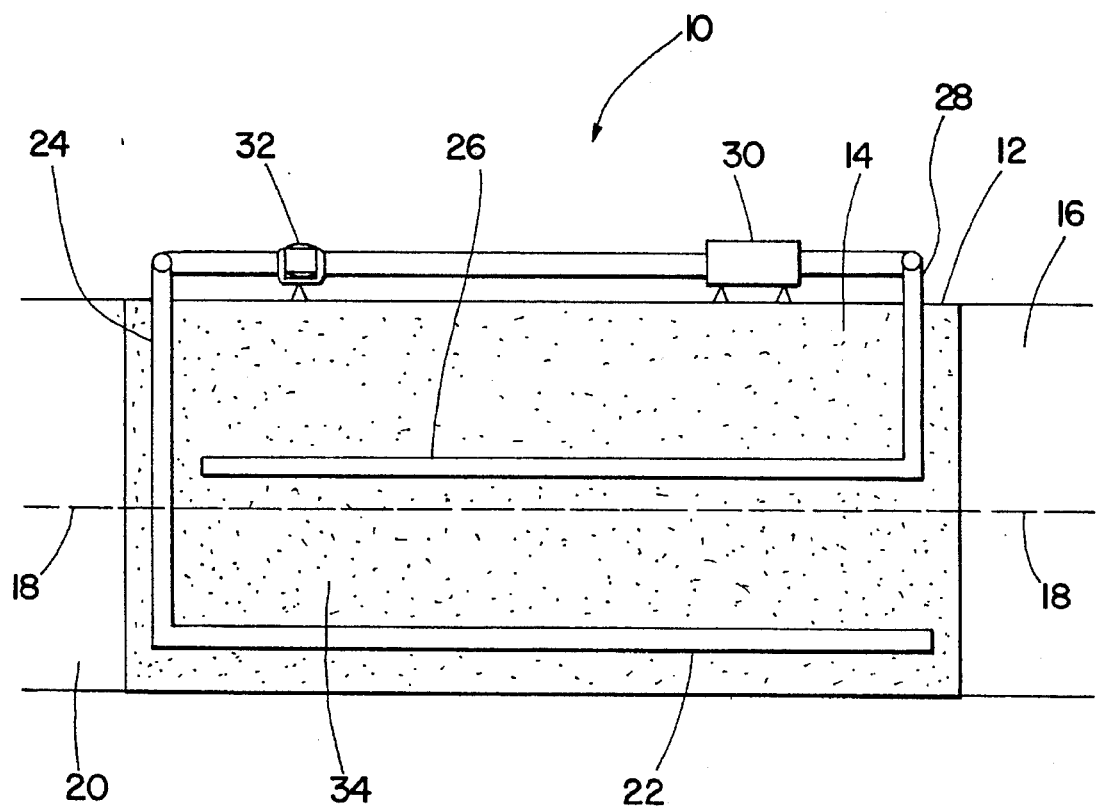

Referring to both FIG. 1 and FIG. 3, the preferred method herein described may be best understood by following the description of the apparatus, designated generally by the numeral 10. Apparatus 10 includes a trench 12 filled with pea gravel 14 or another fluid-permeable fill material. Trench 12 extends down from the ground surface, passes through the vadose zone 16, penetrates the water table 18, and terminates in the phreatic zone 20. The trench 12 preferably is dug as deep as is practical into the phreatic zone 20 and may be dug to the floor of the phreatic zone. Generally, the deeper the trench is dug the wider the trench must be dug. Injection line 22 is laid at the bottom of trench 12 and may be positioned in any orientation. Injection line 22 may be comprised of screened PVC pipe or any other porous, fluid-permeable material. Injection line 22 is in fluid communication with injection line supply 24. Injection line supply 24 may be comprised of impermeable material such as PVC pipe and may be positioned in any orientation desired. Trench 14 is then filled with gravel up to the water table 18. Air and contaminant gas extraction line 26 is placed in the trench above the water table 18 preferably in a horizontal orientation. Extraction line 26 may be comprised of screened PVC pipe or any other porous, fluid-permeable material. Extraction line 26 is in fluid communication with extraction line return 28. Extraction line return 28 may be comprised of impermeable material such as PVC pipe and may be positioned in any orientation desired. Trench 14 is then filled to the level of the ground surface 29 and sealed at 31 with bentonite, concrete or any other non-porous material to prevent contaminant gas leakage into the atmosphere. Extraction line return 28 may be in fluid communication with a contaminant treatment system as at 30. Pump 32 may complete the closed loop apparatus or, both the injection line supply 24 and extraction line return 28 may individually be in communication with such pumps.

The operation of the present invention may be seen in both FIG. 1 and FIG. 3. Pump 32 forces air along injection line supply 24 into injection line 22. The injected air escapes from injection line 22 through the porous surface and mixes with contaminated phreatic water in the lower portion of the trench 12 at 34. The air/water mixture allow sparging of the volatile contaminants from the ground water. The volatile contaminants readily pass off from the water into a gas through evaporation. The injected air then mixes with the contaminant gas and rises through the trench into an upper portion of the trench 12 located in the vadose zone above the water table 18. Extraction line 26 draws the air/contaminant mixture in from the trench and up through extraction line return 28. The mixture may then be treated, as in the contaminant treatment system shown at 30, and returned to the injection line 22 or stored for later treatment and handling.

It may be appreciated that the ground water supply flows through the present invention naturally. Thereby obviating the need to pump the water from the phreatic zone for treatment and return. The ground water is stripped of volatile contaminants while still in the phreatic zone. It may also be appreciated that a series of injection lines 22 and extraction lines 26 or a series of complete systems 10 may be employed for removing volatile contaminants from the phreatic zone.

Figure 2:
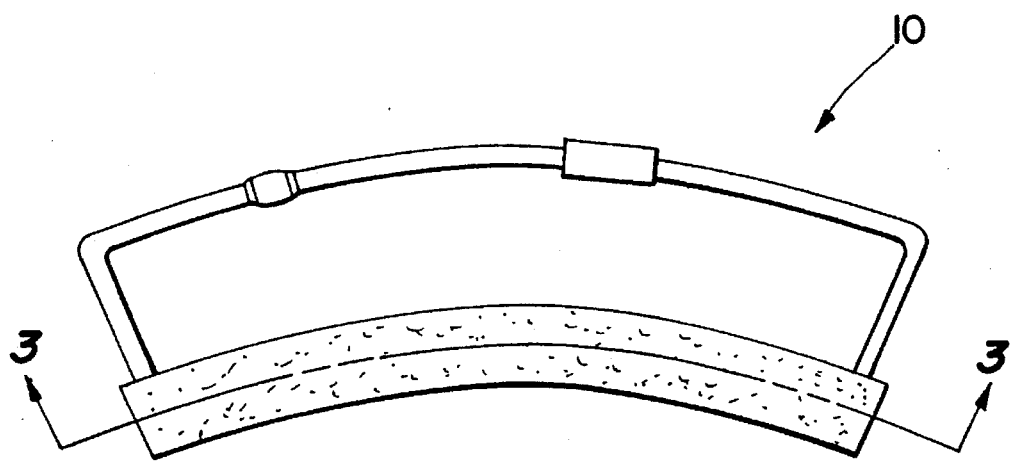
FIG. 2 is an overhead view of another embodiment of the present invention showing the trench in a curving condition to accommodate for local geographic conditions; and, FIG. 3 is a cross-sectional view of the contaminant recovery apparatus of the present invention taken along line 3—3 of FIG. 2.

It is to be understood that the trench of the present invention may form a straight line or any imaginable curve or curves, as in FIG. 2, to accommodate local conditions and requirements. The depth and width of trench 12 will also vary with local conditions. Such techniques for digging proper trenches at the appropriate depth and width are within the realm of those skilled in the art.

The contaminant treatment system may also comprise storage, testing and filtering systems as required. It is understood that these devices are not necessary to the practice of the invention and the elimination of the contaminant treatment system may be done and still maintain the spirit of this invention. Such treatment systems are well known in the art.

The scope of the invention is not to be considered limited by the above disclosure, and modifications are possible without departing from the spirit of the invention as evidenced by the following claims.

What is claimed is:

1. A closed-loop process for removing volatile contaminants from a contaminated area of the earth, wherein the contaminated area of the earth has a phreatic zone, the contaminant being present in the phreatic zone, which comprises the steps of:

establishing a trench extending downwardly from the surface of the ground within the contaminated area, said trench having a lower portion substantially within the phreatic zone and an upper portion substantially within the vadose zone;

placing an injection pipe having a perforated surface in the bottom of said lower portion of said trench;

filling fluid-permeable fill material into said lower portion of said trench above the water table so that said fill material will permit fluid to flow readily through said lower portion;

placing an extraction pipe having a perforated surface into said trench upper portion;

filling fluid-permeable fill material into said upper portion of said trench up to the ground surface so that said fill material will permit fluid to flow readily through said upper portion;

sealing said trench at said ground surface to prevent gas passage between said trench and the atmosphere;

applying air under pressure to said injection pipe effective to induce a flow of air from said injection pipe into said trench lower portion; and applying a vacuum to said extraction pipe effective to induce a flow of air and a gas containing vapor of said contaminant present in said trench upper portion into said extraction pipe so that said contaminant is removed from said ground.

2. The process of claim 1 wherein both the vacuum and pressurized air are supplied by an air pump in fluid communication with both said injection pipe and said extraction pipe.

3. The process of claim 1 further comprising the step of separating the volatile contaminants removed from said extraction pipe from said air.

4. The process of claim 3 further comprising the step of returning the air to said injection pipe.

5. The process of claim 1 further comprising the step of delineating the extent of the contaminated area and locating said trench downstream of said contaminated area.

6. The process of claim 1 wherein the contaminated area of earth comprises a soil formation which is finer than fine sand.

7. A contaminant removal system for removing volatile contaminants from the phreatic zone of a contaminated ground area, said contaminant removal system comprising:

a trench having a lower portion and an upper portion, said lower portion substantially disposed within the phreatic zone, said upper portion substantially disposed within the vadose zone;

a first conduit disposed within said lower portion of said trench having a perforated surface;

a second conduit disposed within said upper portion of said trench having a perforated surface;

a fluid-permeable fill material filling said upper portion and said lower portion of said trench;

a seal at the ground surface on said trench effective to prevent gas passage between said trench upper portion and the atmosphere;

a vacuum operatively connected to said second conduit wherein said second conduit is in fluid flow communication with said vacuum; and a blower operatively connected to said first conduit wherein said first conduit is in fluid flow communication with said blower.

8. The system of claim 7 which further comprises a contaminant treatment system operatively connected in fluid communication with said second conduit.

9. The system of claim 7 wherein said vacuum and blower comprise an air pump.

10. The system of claim 7 which further comprises a series of trenches.

11. The system of claim 7 wherein said first and second conduit comprises screened PVC pipe.

12. The system of claim 7 wherein the contaminated ground area comprises soil formations which are finer than fine sand.

\* \* \* \* \*